(12) United States Patent
Schreiber et al.

(10) Patent No.: US 8,645,822 B2
(45) Date of Patent: Feb. 4, 2014

(54) MULTI-PLATFORM PRESENTATION SYSTEM

(75) Inventors: Patrick Schreiber, Sammamish, WA (US); Christopher H. Moffatt, Sammamish, WA (US); Ravipal Soin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1259 days.

(21) Appl. No.: 12/237,533

(22) Filed: Sep. 25, 2008

(65) Prior Publication Data

US 2010/0077298 A1 Mar. 25, 2010

(51) Int. Cl.
*G06F 17/00* (2006.01)

(52) U.S. Cl.
USPC .......................................... 715/249; 715/240

(58) Field of Classification Search
USPC .................. 715/273, 200, 249, 240
See application file for complete search history.

(56) References Cited

U.S. PATENT DOCUMENTS

| | | | |
|---|---|---|---|
| 5,907,704 A | 5/1999 | Gudmundson et al. | |
| 6,769,127 B1 * | 7/2004 | Bonomi et al. | 725/39 |
| 6,904,566 B2 * | 6/2005 | Feller et al. | 715/728 |
| 6,959,348 B1 * | 10/2005 | Chan et al. | 710/65 |
| 7,207,006 B1 * | 4/2007 | Feig et al. | 715/723 |
| 7,240,120 B2 * | 7/2007 | Frantz et al. | 709/231 |
| 7,296,032 B1 * | 11/2007 | Beddow | 1/1 |
| 7,336,720 B2 * | 2/2008 | Martemyanov et al. | 375/240.12 |
| 7,337,392 B2 * | 2/2008 | Lue | 715/236 |
| 7,346,920 B2 | 3/2008 | Lamkin et al. | |
| 7,511,718 B2 * | 3/2009 | Subramanian et al. | 345/619 |
| 7,747,782 B2 * | 6/2010 | Hunt et al. | 709/246 |
| 7,793,206 B2 * | 9/2010 | Lim et al. | 715/201 |
| 8,245,124 B1 * | 8/2012 | Gupta | 715/202 |
| 2003/0120748 A1 * | 6/2003 | Begeja et al. | 709/217 |
| 2004/0034622 A1 | 2/2004 | Espinoza et al. | |
| 2004/0160445 A1 * | 8/2004 | Whatmough | 345/473 |
| 2004/0201610 A1 | 10/2004 | Rosen et al. | |
| 2005/0165887 A1 | 7/2005 | Asai | |

(Continued)

OTHER PUBLICATIONS

"IBM Cognos 8 Business Intelligence Reporting and Dashboards", Retrieved at <<http://www.cognos.com/pdfs/factsheets/fs_c8bi_reporting_and_dashboards.pdf>>, pp. 4.

(Continued)

*Primary Examiner* — Manglesh M Patel
(74) *Attorney, Agent, or Firm* — Alleman Hall McCoy Russell & Tuttle LLP (57) ABSTRACT

A method for presenting a presentation authored on a first platform utilizing first-platform-specific-renderable objects is provided. The method includes, at a presentation player executable on a second platform different from the first platform: receiving a presentation file, in response to execution of the presentation file by the presentation player, extracting frame data from the presentation file, the frame data including a frame document object model corresponding to each frame of the presentation, parsing the frame document object model of each frame of the presentation to identify the first-platform-specific-renderable objects, translating the first-platform-specific-renderable objects into corresponding second-platform-specific-renderable objects having second-platform-specific binaries, and rendering the second-platform-specific binaries of each second-platform-specific-renderable object utilizing second-platform-specific primitives retrieved from data storage in electronic communication with the second-platform, the second-platform-specific-renderable objects being rendered according to the frame document object model of each frame to display the presentation.

16 Claims, 4 Drawing Sheets

(56) References Cited

U.S. PATENT DOCUMENTS

| | | |
|---|---|---|
| 2005/0273711 A1 | 12/2005 | Herzman et al. |
| 2006/0031749 A1* | 2/2006 | Schramm et al. ............ 715/500.1 |
| 2006/0232448 A1* | 10/2006 | Silverman et al. ............... 341/50 |
| 2007/0006078 A1* | 1/2007 | Jewsbury et al. ............... 715/716 |
| 2007/0058718 A1* | 3/2007 | Shen et al. ............... 375/240.12 |
| 2007/0162953 A1 | 7/2007 | Bolliger et al. |
| 2008/0126943 A1* | 5/2008 | Parasnis et al. ............... 715/730 |
| 2008/0276158 A1* | 11/2008 | Lim et al. ............... 715/201 |
| 2009/0106639 A1* | 4/2009 | Blinnikka et al. ............ 715/200 |
| 2009/0113302 A1* | 4/2009 | Cho et al. ............... 715/716 |
| 2010/0150526 A1* | 6/2010 | Rose et al. ............... 386/70 |
| 2010/0235765 A1* | 9/2010 | Worthington ............... 715/760 |

OTHER PUBLICATIONS

Meng, et al., "The "Author Once, Present Anywhere" (AOPA) Software Platform", Retrieved at <<http://www.se.cuhk.edu.hk/hccl/publications/pub/HKICC2003-AOPA.pdf>>, pp. 10.

"IMS Content Packaging Information Model: Version 1.1.2 Final Specification", Retrieved at <<http://www.imsglobal.org/content/packaging/cpv1p1p2/imscp_infov1p1p2.html>>, May 15, 2008, pp. 11.

"Adobe Director 10", Retrieved at <<http://www.studica.com/products/product_detail.cfm?productid=53217>>, May 15, 2008, pp. 2.

"Ezediamx 3.0.7", Retrieved at <<http://www.filedudes.com/ezediamx-download-6257.html>>, May 16, 2008, pp. 3.

* cited by examiner

MULTI-PLATFORM PRESENTATION SYSTEM

BACKGROUND

A computerized presentation may be created on a computing device and distributed to an audience for viewing and interaction, for example, by making the presentation available for download from a server on a computer network, or by emailing the presentation to various end users. Thus, audience members may view the presentation on different computing platforms, which may run different operating systems and application programs. In order to accommodate the variety of different computing platforms so that the audience may properly view a presentation, the presentation may have to be recreated multiple times in different formats that will properly be displayed on each of the different computing platforms. Creating multiple versions of the presentation in this manner can be cumbersome and time consuming, resulting in increased development costs for the presentation.

SUMMARY

A method is provided for presenting a presentation authored on a first platform utilizing first-platform-specific-renderable objects one or more different platforms. The method may be performed by a presentation player on a second platform that is different from the first platform. The method may include receiving a presentation file, extracting frame data from the presentation file, parsing the frame data to identify first-platform-specific-renderable objects, translating the first-platform-specific-renderable objects into corresponding second-platform-specific-renderable objects including second-platform-specific binaries, and rendering the second-platform-specific binaries of the second-platform-specific-renderable objects utilizing second-platform-specific primitives to display the presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to authoring a presentation on a platform and presenting the presentation on one or more different platforms, where the presentation is configured to be displayed on each platform presenting the presentation. In particular, display of the presentation may be transformed and/or scaled up or down to coordinate with the runtime characteristics (e.g., protocols, processing languages, visual rendering capabilities, etc.) of the platform on which the presentation is being presented.

Figure 1:
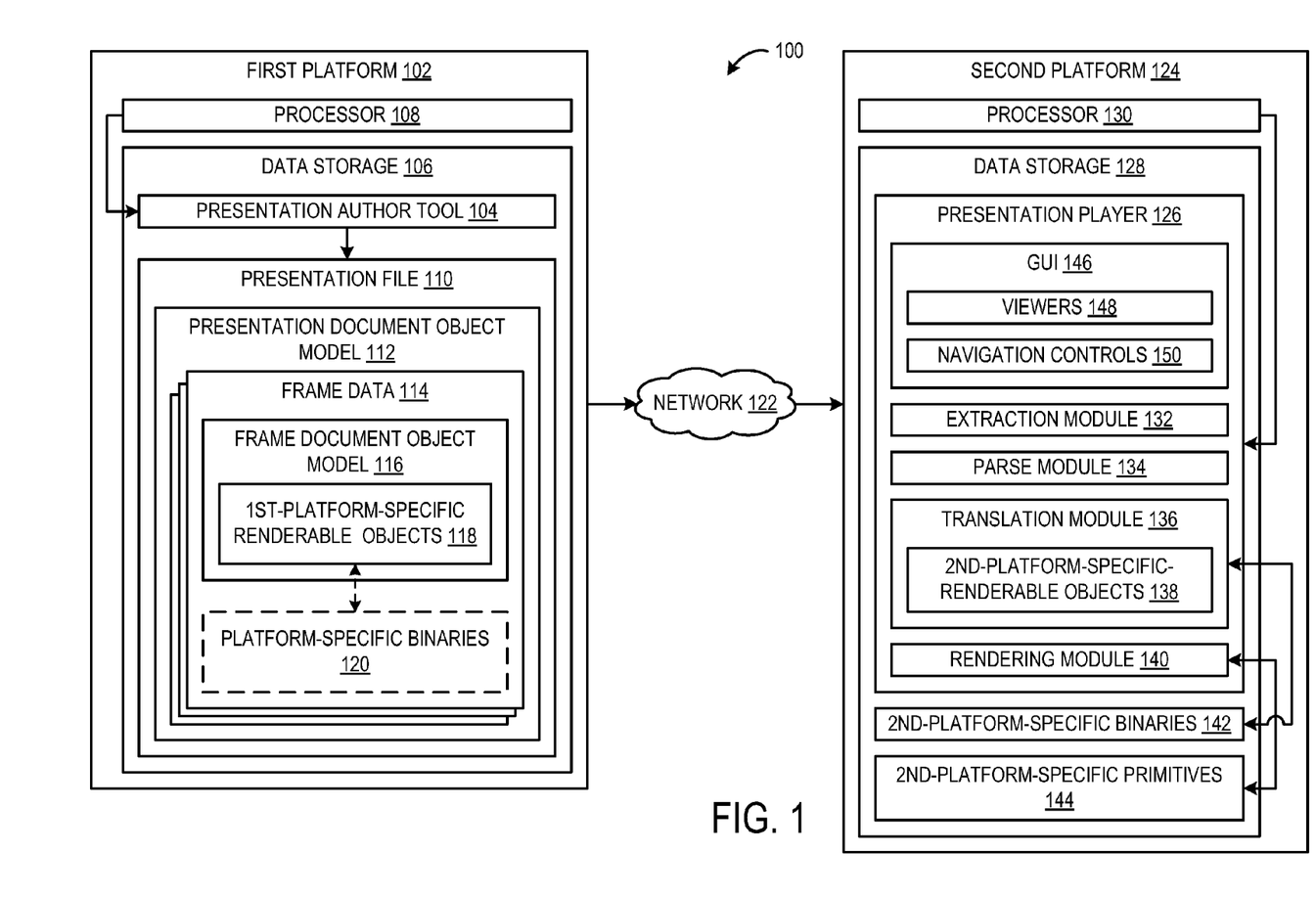
FIG. 1 is a schematic view illustrating a computerized presentation system according to an embodiment of the present disclosure.

FIG. 1 schematically shows an embodiment of a computerized presentation system 100 in accordance with the present disclosure. Computerized presentation system 100 may include a first platform 102. In the context of the present disclosure, "platform" as used herein may be defined as a hardware architecture and/or software framework that permits software applications to be executed on a computing device. Typical platforms may include, but are not limited to, a computer's architecture (e.g., Wintel), operating system (e.g. Microsoft Windows®), programming languages and related runtime libraries (e.g., .NET Framework®), and/or graphical user interface. In some cases, a platform may include any or all of the above elements. Further, "platform-specific" software applications or programs, objects, elements, etc. may be configured specifically for optimized execution by a particular hardware architecture and/or software framework. In other words, the programs, objects, elements, etc. may be natively coded to be understood by the hardware architecture and/or software framework.

A presentation author tool 104, executable by first platform 102, may be configured to generate a presentation file for presentation on one or more different platforms. For example, a user may create a presentation that includes multiple frames that each contains video, images, buttons, and/or text elements (a.k.a., "objects") that are provided by the first platform or are platform-specific. The collection of frames may be packaged into presentation file 110 created by presentation author tool 104. In particular, presentation file 110 may include a presentation document object model 112 that defines the frame hierarchy or the order of the frames in the presentation as well as the navigation between frames. For example, a presentation document object model may define which frames are linked to each other and which transitions are performed when switching between frames.

Each frame has frame data 114 that includes objects in the frame, such as first-platform-specific-renderable objects 118, as well as a frame document object model 116 which defines the layout of the objects on the frame. First-platform-specific-renderable objects 118 are authored using binaries that are understood by primitives of first platform 102 utilized to render first-platform-specific-renderable objects 118. As such, first-platform-specific-renderable objects 118 may be optimized for presentation by first platform 102 or may have the visual rendering characteristics defined by first platform 102.

It will be appreciated that frame data 114 may include objects in addition to first-platform-specific-renderable-objects 118. For example, frame data may include platform-independent objects. Further, it will be appreciated that presentation author tool 104 may be implemented via code that is stored in data storage 106 and executed by a processor 108 of first platform 102. In one example, data storage 106 is a mass storage device, such as a hard drive.

Upon being output by presentation author tool 104, presentation file 110 may be distributed via network 122 for viewing and interaction at one or more platforms of system 100, such as a second platform 124. Network 122 may facilitate wired and/or wireless communication between computing platforms connected to the network. Further, network 122 may include various interconnected networking devices that facilitate communication. It will be appreciated that network 122 may, for example, include a local area network (LAN)

and/or a wide area network (WAN), such as the Internet. In some cases, presentation file 110 may be distributed to other platforms via portable storage media (e.g., compact disc (CD), digital video disc (DVD), floppy disk, etc), as opposed to distribution via network 122.

Presentation player 126, executable by second platform 124, may be configured to receive presentation file 110. Presentation player 126 may be configured to transform the display experience of the presentation to coordinate with the runtime characteristics of second platform 124 so that the presentation is optimized for display on second platform 124 and/or adapted to the visual rendering characteristics of second platform 124. It will be appreciated that presentation player 126 may be implemented via code that is stored in data storage 128 and executed by a processor 130 of second platform 124.

Presentation player 126 may include an extraction module 132 configured to extract frame data 114 from presentation file 110 in response to execution of presentation file 110 by presentation player 126. In particular, extraction module 132 may scan presentation document object model 112 to identify frame data 114 corresponding to each frame of the presentation.

Parse module 134 may be configured to identify a frame document object model 116 of frame data 114 for each frame. Frame document object model 116 may provide visual layout information about each frame including the position and appearance of each object on the frame. Parse module 134 may be configured to parse out first-platform-specific-renderable objects 118 from each frame document object model 116.

Translation module 136 may be configured to translate first-platform-specific-renderable objects 118 parsed by parse module 134 into corresponding second-platform-specific-renderable objects 138 having second-platform-specific binaries 142. In particular, a second-platform-specific-renderable object may be a version of the particular object that is native to the second-platform. In other words, the second-platform-specific-renderable object may be defined using binaries from the runtime library of the second platform that are understood by the processing language of the second platform so that the objected displayed by the second platform has the visual rendering characteristics of the second platform.

For example, a typical object used in a presentation may be a "play" button that may be selected to initiate a video. On the first platform the "play" button may have specific visual rendering characteristics (e.g., shape, size, color, etc.) that are defined by the processing language and/or runtime libraries of the first platform. On the second platform, the "play" button may have visual rendering characteristics that differ from the first platform based on the definitions provided by the processing language and/or runtime libraries of the second platform. As such, the "play button" may be translated from a first-platform-specific version to a second-platform-specific version in order to suitably render the "play" button for display on the second platform.

Rendering module 140 may be configured to render the second-platform-specific-renderable objects 138 utilizing second-platform-specific primitives 144 retrieved from data storage 128 in electronic communication with second-platform 124. Since second-platform-specific-renderable objects 138 have second-platform-specific binaries 142 that are understood by second-platform-specific primitives 144, the second-platform-specific-renderable objects may be rendered suitably for display on second platform 124 such that the second-platform-specific-renderable objects conform to the visual rendering characteristics of second platform 124.

Graphical user interface (GUI) 146 may be generated by presentation player 126 to display the presentation on second platform 124. GUI 146 may include frame viewers 148 configured to present second-platform-specific-renderable objects 138 rendered according to frame document object model 116 model of each frame to display the presentation. Display of platform-specific-renderable objects utilizing viewers will be discussed in further detail below with reference to FIG. 3. GUI 146 may include navigation controls 150 to navigate between frames of the presentation according to the links and transitions defined by presentation document object model 112.

In the above described embodiment, a presentation file may be authored on a first platform utilizing objects that are rendered according to the visual rendering characteristics of the first platform. Further, the presentation file may be distributed to a variety of different platforms for viewing and interaction. A presentation player receiving the presentation file may be configured to translate the platform-specific-renderable objects of the presentation at runtime of the presentation according to the runtime characteristics of the platform on which the presentation player is executable. As such, the displayed objects may conform to the visual rendering characteristics of that platform. This approach may be referred to as "on the fly" translation that may be performed at presentation runtime. The on the fly translation approach may place the translation responsibility onto the presentation player and associated platform so that the size of presentation files may be reduced resulting in faster presentation file distribution. This may be applicable for computing applications that have sufficient memory or storage, such as personal "desktop" computing devices or laptop computing devices.

In some embodiments, during presentation authoring, presentation author tool 104 may be configured to insert platform-specific binaries 120 of one or more different platforms for each of first-platform-specific-renderable objects 118 into the presentation file 110. By including the platform-specific binaries in the presentation file, platform-specific-renderable object translation at the presentation player may be eliminated. This approach may place the translation responsibility on the authoring tool and associated platform so that the resources used by the presentation player may be reduced, resulting in greater versatility of platforms able to display the presentation. This may be applicable for computing applications having reduced memory or data storage capabilities, such as hand-held computing devices or mobile computing devices. Inserting platform-specific binaries during presentation file creation will be discussed in further detail below with reference to FIG. 4.

Figure 2:
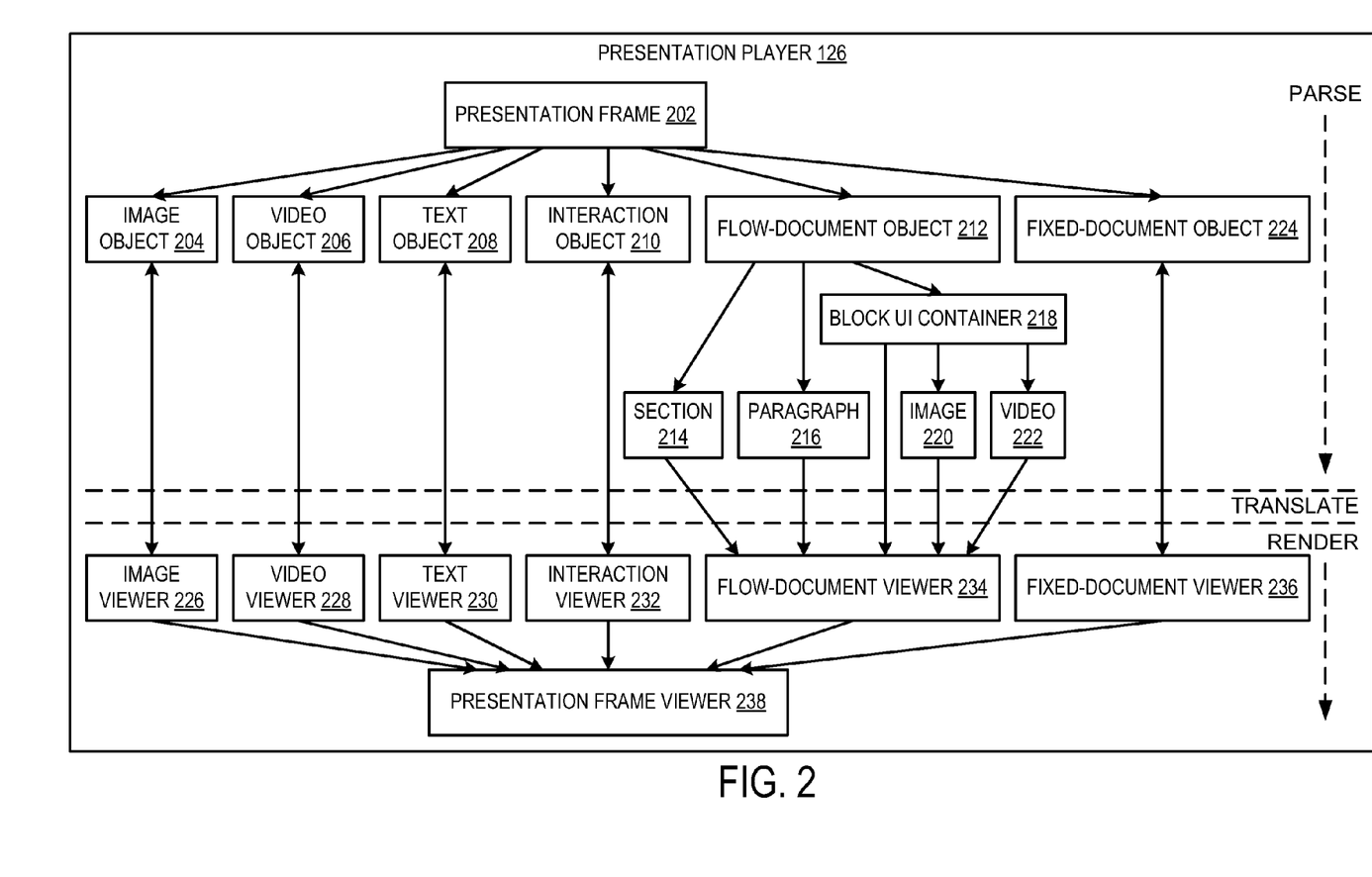
FIG. 2 is a schematic view illustrating a process flow performed by an embodiment of a presentation player of the system of FIG. 1 to present a presentation.

FIG. 2 schematically shows presentation player 126 on which a presentation may be displayed. As discussed above, platform-specific-renderable objects of a presentation may be parsed, translated, and rendered by modules of the presentation player for display. Presentation frame 202, which may be one of a plurality of frames in a presentation file, may be parsed by presentation player 126 to identify renderable objects. Parsing may be performed by scanning a frame document object model of presentation frame 202. In the illustrated embodiment, parsing may identify a plurality of different renderable objects that may be platform-specific or platform-independent. For example, image object 204, video object 206, text object 208, interaction object 210, flow document object 212, and fixed document object 224 may be identified for translation and/or rendering.

Interaction object 210 may include buttons, selectors, shortcuts, or virtually any other suitably element for facilitating user interaction with the presentation. Flow document object 212 may include a variety of content types having enhanced formatting and visual characteristics. These content types are rendered by content specific viewers and placed upon a graphical mesh for display by a presentation frame viewer 238. The flow-document object 212 may be parsed to identify each of the content types. For example, flow-document object 212 may be parsed into section 214, paragraph 216, block user interface container 218 which may be further parsed in to image 220 and video 222. Fixed-document object 224 may include a fixed-layout document that may include text, fonts, images, and/or graphics. Fixed-document object 224 may be platform independent. One example of a fixed-document object (or format) that may be identified during parsing is an Xml Paper Specification (XPS) file.

Upon translation and rendering of the parsed objects, each object may be displayed in a particular viewer corresponding to that object. In particular, image viewer 226 may display a rendered version of image object 204, video viewer 228 may display a rendered version of video object 206, text viewer 230 may display a rendered version of text object 208, interaction viewer 232 may display a rendered version of interaction object 210, flow-document viewer 234 may display a rendered version of flow document object 212 including the encapsulated content types, and fixed-document viewer 236 may display a rendered version of fixed document object 224. Each of the respective object viewers may be arranged in presentation frame viewer 238 according to the frame document object model of presentation frame 202.

Figure 3:
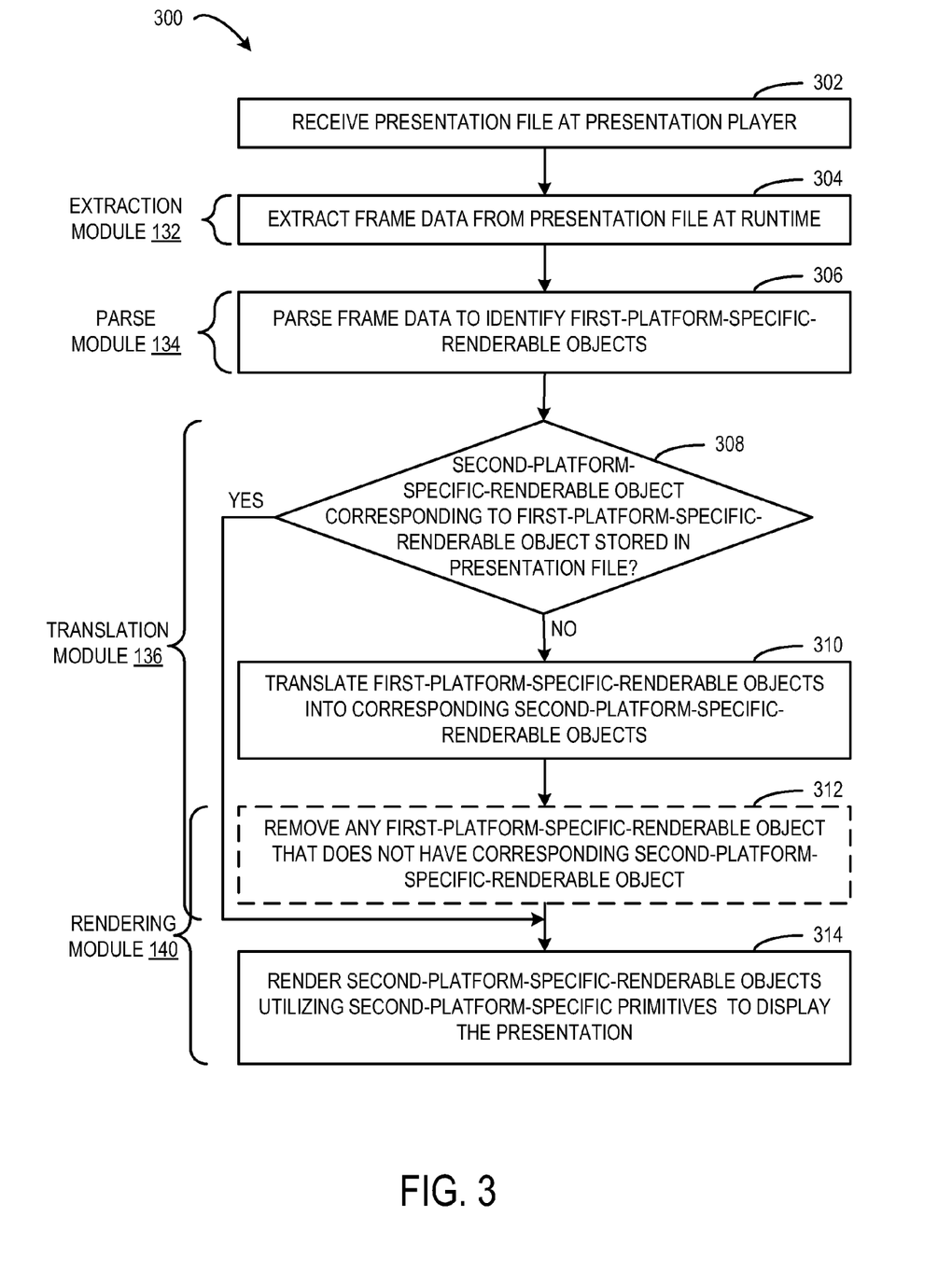
FIG. 3 is a schematic view illustrating a presentation player having viewers for displaying platform-specific objects in a frame of a presentation.

FIG. 3 shows a flow diagram of an embodiment of a method 300 for presenting a presentation authored on a first platform utilizing platform-specific-renderable-objects on a second platform different from the first platform. Method 300 may include, at 302, receiving a presentation file at a presentation player executable on the second platform.

At 304, the method may include extracting frame data from the presentation file. In particular, extraction may be performed by scanning a presentation document object model of the presentation file to identify the frames of the presentation and associated frame data. The frame data may include a frame document object model of each frame of the presentation. As discussed above, extraction may be performed by extraction module 132 of presentation player 126 (See FIG. 1).

At 306, the method may include parsing the frame data to identify first-platform-specific-renderable objects. In particular, parsing may be performed by scanning a frame document object model of each frame of the presentation to navigate through the object hierarchy to identify first-platform-specific-renderable objects. As discussed above, parsing may be performed by parse module 134 of presentation player 126 (See FIG. 1).

At 308, the method may include for each identified first-platform-specific-renderable object, determining if a second-platform-specific-renderable object corresponding to the first-platform-specific-renderable object is present in the presentation file. If the second-platform-specific-renderable object is present in the presentation file the method moves to 314. Otherwise, the second-platform-specific-renderable object is not present in the presentation file and the method moves to 310.

At 310, the method may include for each identified first-platform-specific-renderable object not having a corresponding second-platform-specific-renderable object that is not present in the presentation file, translating the first-platform-specific-renderable object into a corresponding second-platform-specific-renderable object. The translated objects may include second-platform-specific binaries that may be utilized to render the object according to the visual rendering characteristics of the second platform. In some cases, translating the first-platform-specific-renderable objects into the second-platform-specific-renderable objects may include changing one or more visual rendering characteristics of the first-platform-specific-renderable object.

For example, during translation of a text object a character styling of the text object may be changed according to the visual rendering characteristics of the second platform. In one particular example, each platform has a different default font for text objects, thus during translation the font of the text object is changed to conform to the visual rendering characteristics of the second platform. As another example, a text element may be a paragraph of text and during translation the paragraph styling or formatting of the object may be changed to conform to the visual rendering characteristics of the second platform. As yet another example, a translated object may be an image object and during translation the graphical resolution of the image object may be changed to conform to the visual rendering characteristics of the second platform.

In some cases, translation of platform-specific-renderable objects may be performed to accommodate the capabilities of platforms on which the presentation is displayed. For example, the visual rendering characteristics of platform-specific-renderable objects of a presentation authored on a personal computer and distributed to a mobile device may be downscaled during translation to accommodate the visual rendering capabilities of the mobile device so the that presentation may be suitably displayed by the mobile device. Downscaling may include both changing a visual rendering characteristic of platform-specific-renderable object such as lowering a resolution of the object, and removing one or more elements of an object that are deemed to be tertiary such as background elements, coloring, boarders, etc. As discussed above, translating may be performed by translation module 136 of presentation player 126 (See FIG. 1).

In some embodiments, at 312, the method may include, prior to rendering, removing any first-platform-specific-renderable object that does not have a corresponding second-platform-specific-renderable object. The removal of platform-specific-renderable objects may be performed as a downscaling measure for platforms that may not be capable of rendering certain objects for display. In some embodiments, removal of platform-specific-renderable objects may be performed by translation module 136 in which case the objects may be actively removed. In some embodiments, removal of platform-specific-renderable objects may be performed by rendering module 140 in which case the object may not be rendered for display.

At 314, the method may include rendering the second-platform-specific binaries of each second-platform-specific-renderable object utilizing second-platform-specific primitives from the second-platform to display the presentation. The second-platform-specific-renderable objects may be rendered according to the frame document object model of each frame so that the objects are suitably positioned for display on the second platform. As discussed above, rendering may be performed by rendering module 140 of presentation player 126 (See FIG. 1). It will be appreciated that second-platform-specific-renderable objects present in the presentation file and second-platform-specific-renderable objects generated via translation may be rendered by rendering module 140.

The above described method may permit a presentation authored on a platform utilizing platform-specific objects to be displayed on different platforms by translating the platform-specific objects on the fly at the platform on which the presentation is being displayed. In this way, a presentation may be optimized according to the runtime characteristics of the platform so that the presentation may be suitably displayed by the platform. Moreover, the viewing experience of a presentation may be changed to conform to the visual rendering characteristics of the platform on which the presentation is being displayed.

Figure 4:
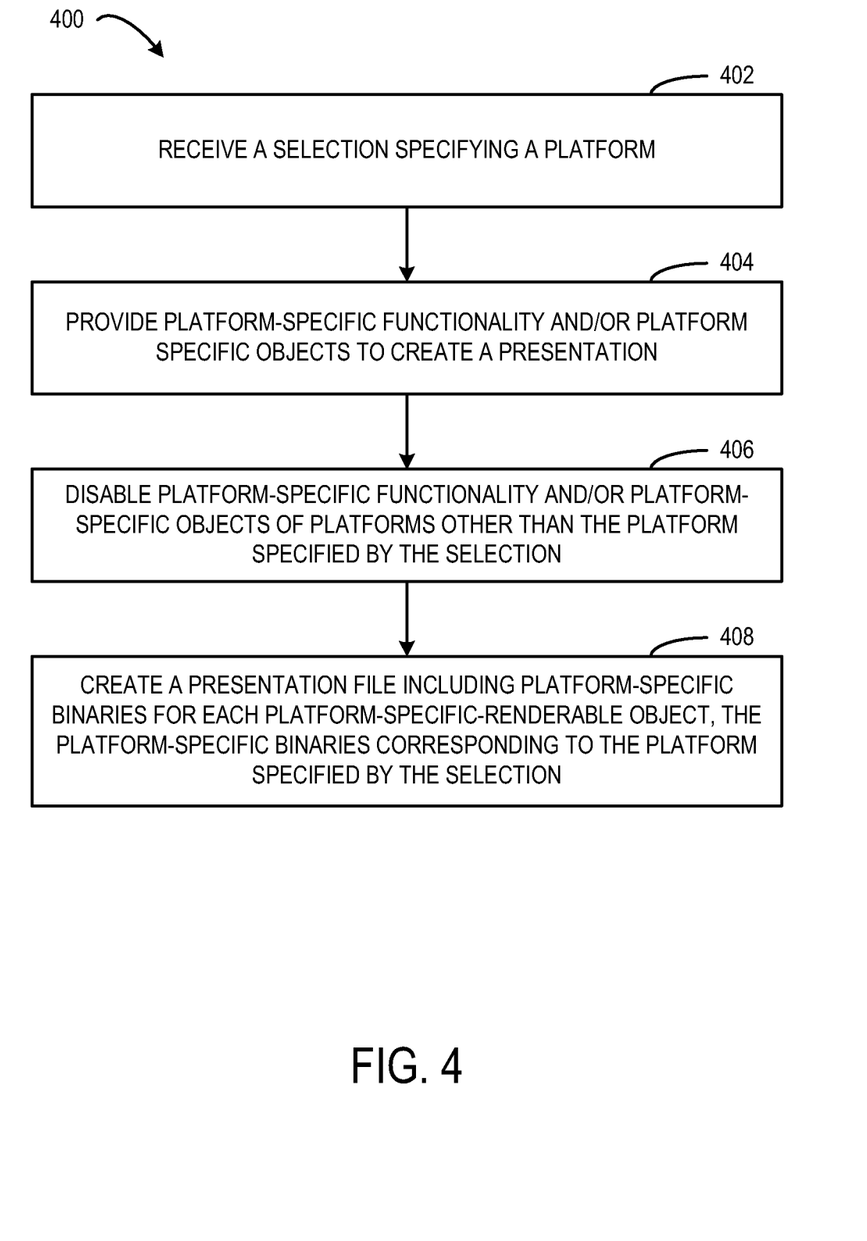
FIG. 4 is a process flow diagram illustrating an embodiment of a method for authoring a presentation on a first platform for presentation on one or more different platforms.

FIG. 4 shows a flow diagram of an embodiment of a method 400 for authoring a presentation on a first platform for presentation on one or more platforms different from the first platform. Method 400 may be performed by presentation authoring tool 104 executable on first platform 102. Method 400 may include at 402, receiving a selection specifying a platform. The selection may dictate the format in which the presentation may be authored. In some cases, the selected platform may be a second platform different from the first platform on which the presentation author tool is executable.

At 404, the method may include providing platform-specific functionality and/or platform-specific-renderable objects to create the presentation based on the platform specified by the selection.

At 406, the method may include disabling platform-specific functionality and/or platform-specific objects of platforms other than the selected platform for use in creation of the presentation. By disabling the non-specified platform-specific functionality and/or objects, the presentation may be created using objects having similar visual rendering characteristics. Accordingly, a presentation having styling consistent with the specified platform may be created.

In some cases, functionality and/or objects of platforms may be disabled due to the rendering capabilities of the selected platform. For example, a mobile device platform may have reduced visual rendering capabilities or data storage capacity. Thus, resource intensive functionality and/or objects of other platforms may be disabled because the mobile platform may be incapable of presenting the objects/presentation (or the presentations may be presented with less than suitable operation) due to the reduced capabilities of the platform.

At 408, the method may include creating a presentation file including platform-specific binaries for each platform-specific-renderable object. The platform-specific-binaries may correspond to the platform specified by the selection. The platform-specific binaries may be renderable using platform-specific primitives of the platform specified by the selection executing the presentation at runtime. Further, in some cases, the presentation file may be created in a format of the platform specified by the selection.

In some embodiments, during presentation file creation, platform-specific binaries for a plurality of different platforms may be inserted into the presentation file for rendering of the second-platform-specific-renderable objects by one of the plurality of different platforms at execution of the presentation file.

The above described method may permit a presentation to be authored according to the visual rendering characteristics of a platform selected by the creator that may be presented on one or more different platforms.

It will be appreciated that the embodiments described herein may be implemented, for example, via computer-executable instructions or code, such as programs, stored on computer-readable storage media and executed by a computing device, such as a processor of server computing subsystem, for example. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, mobile device, microprocessor-based programmable consumer electronics and/or appliances, etc.

It will be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for presenting a presentation authored on a first platform utilizing first-platform-specific-renderable objects, comprising, at a presentation player executable on a second platform different from the first platform:

receiving a presentation file;

in response to execution of the presentation file by the presentation player, extracting frame data from the presentation file by scanning a presentation document object model of the presentation file to identify the frame data, the frame data including a frame document object model corresponding to each frame of the presentation;

parsing the frame document object model of each frame of the presentation to identify the first-platform-specific-renderable objects;

translating the first-platform-specific-renderable objects into corresponding second-platform-specific-renderable objects having second-platform-specific binaries including changing one or more visual rendering characteristics of each first-platform-specific-renderable object to conform to visual rendering characteristics of the second platform; and rendering the second-platform-specific binaries of each second-platform-specific-renderable object utilizing second-platform-specific primitives retrieved from data storage in electronic communication with the second platform, the second-platform-specific-renderable objects being rendered according to the frame document object model of each frame to display the presentation according to the visual rendering characteristics of the second platform.

2. The method of claim 1, further comprising:

prior to rendering, removing any first-platform-specific-renderable object that does not have a corresponding second-platform-specific-renderable object.

3. The method of claim 1, wherein changing the one or more visual rendering characteristics of each first-platform-specific-renderable object includes downscaling one or more visual rendering characteristics of the second-platform-specific-renderable object relative to the corresponding one or more visual rendering characteristics of the first-platform-specific-renderable object.

4. The method of claim 1, wherein changing the one or more visual rendering characteristics includes changing from a character styling of the first platform to a character styling of the second platform.

5. The method of claim 1, wherein changing the one or more visual rendering characteristics includes changing from a paragraph styling of the first platform to a paragraph styling of the second platform.

6. The method of claim 1, wherein changing the one or more visual rendering characteristics includes changing a graphical resolution of one of the first-platform-specific-renderable objects.

7. The method of claim 1, wherein an object is selected from the group consisting of a video object, an image object, an interaction object, a text object, a flow document object, and a fixed-document object.

8. The method of claim 1, wherein the presentation document object model of the presentation file defines a hierarchy or an order of the frames in the presentation and a navigation between the frames in the presentation.

9. The method of claim 1, wherein the second platform is a mobile platform executable on a mobile device.

10. The method of claim 9, wherein the second platform is configured to execute a translation module that is configured to downscale one or more elements of the first-platform-specific-renderable object during translation to a mobile-platform-specific object.

11. A presentation player configured to receive a presentation file authored on a first platform, the presentation player executed on a second platform, each of the first and second platforms including respective computing devices with corresponding hardware architectures including a processor and associated memory, the computing devices further including corresponding software frameworks executed by the hardware architectures, and software applications executed within the software frameworks executed by the hardware architectures, the presentation player comprising:

an extraction module configured to extract frame data from the presentation file by scanning a presentation document object model of the presentation file to identify the frame data, the frame data including a frame document object model corresponding to each frame of the presentation file;

a parse module configured to parse the frame document object model of each frame to identify first-platform-specific-renderable objects;

a translation module configured to translate the first-platform-specific-renderable objects into corresponding second-platform-specific-renderable objects having second-platform-specific binaries including changing one or more visual rendering characteristics of each first-platform-specific-renderable object to conform to visual rendering characteristics of the second platform;

a rendering module configured to render the second-platform-specific binaries of each second-platform-specific-renderable object utilizing second-platform-specific primitives retrieved from a storage device in electronic communication with the second platform; and a frame viewer configured to present the second-platform-specific-renderable objects according to the visual rendering characteristics of the second platform and arranged according to the frame document object model of each frame to display the presentation file.

12. The player of claim 11, wherein the second platform is a mobile platform executable on a mobile device.

13. The player of claim 12, wherein the translation module is further configured to downscale one or more elements of the first-platform-specific-renderable object during translation to a mobile-platform-specific-renderable object.

14. The player of claim 11, wherein an object is selected from the group consisting of a video object, an image object, an interaction object, a text object, a flow document object, and a fixed-document object.

15. The player of claim 11, wherein the frame viewer includes a plurality of object viewers that each correspond to one of the second-platform-specific-renderable objects.

16. The player of claim 15, wherein the plurality of object viewers includes a platform-independent viewer configured to present platform-independent-renderable objects of the presentation file.

* * * * *